United States Patent
Konik et al.

(10) Patent No.: US 10,223,386 B2
(45) Date of Patent: *Mar. 5, 2019

(54) READ AND DELETE INPUT/OUTPUT OPERATION FOR DATABASE MANAGEMENT

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,258

(22) Filed: Dec. 28, 2017

(65) Prior Publication Data

US 2018/0121471 A1 May 3, 2018

Related U.S. Application Data

(63) Continuation of application No. 14/546,050, filed on Nov. 18, 2014, now Pat. No. 9,870,378.

(51) Int. Cl.
*G06F 17/30* (2006.01)

(52) U.S. Cl.
CPC .. *G06F 17/30289* (2013.01); *G06F 17/30117* (2013.01); *G06F 17/30348* (2013.01)

(58) Field of Classification Search
CPC ....... G06F 17/30348; G06F 17/301117; G06F 17/30008
See application file for complete search history.

(56) References Cited

U.S. PATENT DOCUMENTS

| | | | |
|---|---|---|---|
| 5,765,200 A | 6/1998 | McIlvain et al. | |
| 6,339,772 B1 * | 1/2002 | Klein ................ | G06F 17/30492 707/704 |
| 6,349,310 B1 | 2/2002 | Klein et al. | |
| 6,363,387 B1 | 3/2002 | Ponnekanti et al. | |
| 7,103,589 B1 | 9/2006 | Kepler et al. | |
| 7,181,453 B2 | 2/2007 | Ronstrom | |

(Continued)

OTHER PUBLICATIONS

Unknown, "Inserting, Updating, and Deleting Data by Using MERGE", Microsoft Technet Library, © 2014 Microsoft http://technet.microsoft.com/en-us/library/bb522522%28v=sql.105%29.aspx, printed Jun. 4, 2014, pp. 1-12.

(Continued)

*Primary Examiner* — Alexander Khong
(74) *Attorney, Agent, or Firm* — Jared C. Chaney (57) ABSTRACT

A computer-implemented method for improving database management includes selecting one or more database records that are requested based on a query statement. The one or more database records may are read from a first database file. The one or more database records are copied from the first database file and stored to a memory. The one or more database records are deleted from the first database file at substantially the same time as the reading the one or more database records. The reading and the deleting occur through a single read and delete input/output (I/O) operation.

17 Claims, 4 Drawing Sheets

(56) References Cited

U.S. PATENT DOCUMENTS

| | | |
|---|---|---|
| 7,330,860 B2 | 2/2008 | Adiba et al. |
| 8,347,292 B2 | 1/2013 | Beckerle et al. |
| 8,463,818 B2 | 6/2013 | Bender |
| 2005/0080759 A1 | 4/2005 | Brown et al. |
| 2005/0278187 A1 | 12/2005 | Bobbitt |
| 2006/0031834 A1 | 2/2006 | Colby et al. |
| 2009/0106325 A1 | 4/2009 | Gutlapalli et al. |
| 2011/0072207 A1 | 3/2011 | Jin et al. |
| 2012/0150917 A1 | 6/2012 | Sundaram et al. |
| 2012/0330913 A1 | 12/2012 | Devadhar |
| 2014/0229429 A1 | 8/2014 | Bestgen et al. |
| 2016/0140137 A1 | 5/2016 | Konik et al. |

OTHER PUBLICATIONS

List of IBM Patents or Patent Applications Treated as Related, Signed Dec. 28, 2017, 2 pages.

* cited by examiner

_(54)_ READ AND DELETE INPUT/OUTPUT OPERATION FOR DATABASE MANAGEMENT

BACKGROUND

This disclosure relates generally to database management systems, and more specifically, to managing input/output ("I/O") operations.

Database manager engines may perform the two main functions of accessing and modifying data from a database file. Database managers may access data by selecting, reading, and delivering particular database records requested by a user based on a query statement. The query statement specifies the particular attributes, table, and query conditions that a user desires. Secondly, database manager engines may modify a database file by inserting (writing) new database records, updating (writing) values in the database records, or deleting all the database records from a table matching specified query conditions. These engines may also perform a "rollback" function, which may return specified data that was deleted, back into its original position in a database file. A database manager reads, writes, updates, or deletes through the discrete corresponding I/O operations of read, write, update, and delete.

SUMMARY

One or more embodiments are directed to a computer-implemented method for improving database management. The method can include selecting one or more database records that are requested based on a query statement. The method can also include reading the one or more database records from a first database file, wherein the one or more database records are copied from the first database file and stored to a memory. Further, the method can include deleting the one or more database records from the first database file at substantially the same time as the reading the one or more database records, wherein the reading and the deleting occur through a single read and delete input/output (I/O) operation.

One or more embodiments are directed to a system for improving database management. The system can include a computing device having a processor and a memory. The memory can store a query processor and a storage engine. The query processor and the storage engine, when executed by the processor, are operable to perform the following operations: an operation to select one or more database records that are requested based on a query statement. In addition, an operation to read the one or more database records from a first database file, wherein the one or more database records are copied from the first database file and stored to a memory. Further, an operation to delete the one or more database records from the first database file at substantially the same time as the reading the one or more database records, wherein the reading and the deleting occur through a single read and delete input/output (I/O) operation.

One or more embodiments are directed to a computer program product. The computer program product comprises a computer readable storage medium having program code embodied therewith. The program code comprises computer readable program code that may be configured for selecting one or more database records that are requested based on a query statement. In addition, the computer readable program code may be configured for reading the one or more database records from a first database file, wherein the one or more database records are copied from the first database file and stored to a memory. Further, the computer readable program code may be configured for deleting the one or more database records from the first database file at substantially the same time as the reading the one or more database records, wherein the reading and the deleting occur through a single read and delete input/output (I/O) operation.

In the Figures and the Detailed Description, like numbers refer to like elements. The drawings included in the present application are incorporated into, and form part of, the specification. They illustrate embodiments of the present invention and, along with the description, serve to explain the principles of the invention. The drawings are only illustrative of certain embodiments and do not limit the invention. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention may be a system, a method, and/or a computer program product. The computer program product may include a computer readable storage medium (or media) having computer readable program instructions thereon for causing a processor to carry out aspects of the present invention.

Aspects of the present disclosure relate generally to database management systems, and more specifically, to managing a read and delete I/O operation accordingly. While the present disclosure is not necessarily limited to such application, various aspects of the disclosure may be appreciated through a discussion of various examples using this context.

Each time a database manager utilizes the discrete I/O operations to read and delete a database record, it may do so in costly iterative cycles. For example, a compiler may perform a first instruction by compiling the query statement that corresponds to the "read" I/O operation. The database manager may then access or select the particular database record that corresponds to the read I/O operation. The database manager may then have to choose to commit to or abort the read I/O operation. Finally, the database manager may read the database record from a database that is physically housed within a disk. The compiler may then perform a second instruction by compiling the query statement that corresponds to the "delete" I/O operation, and the same process is repeated. This means that the management of these I/O operations may often be done through costly and time consuming cycles or transactions, as each operation may only be performed discretely.

Figure 1:
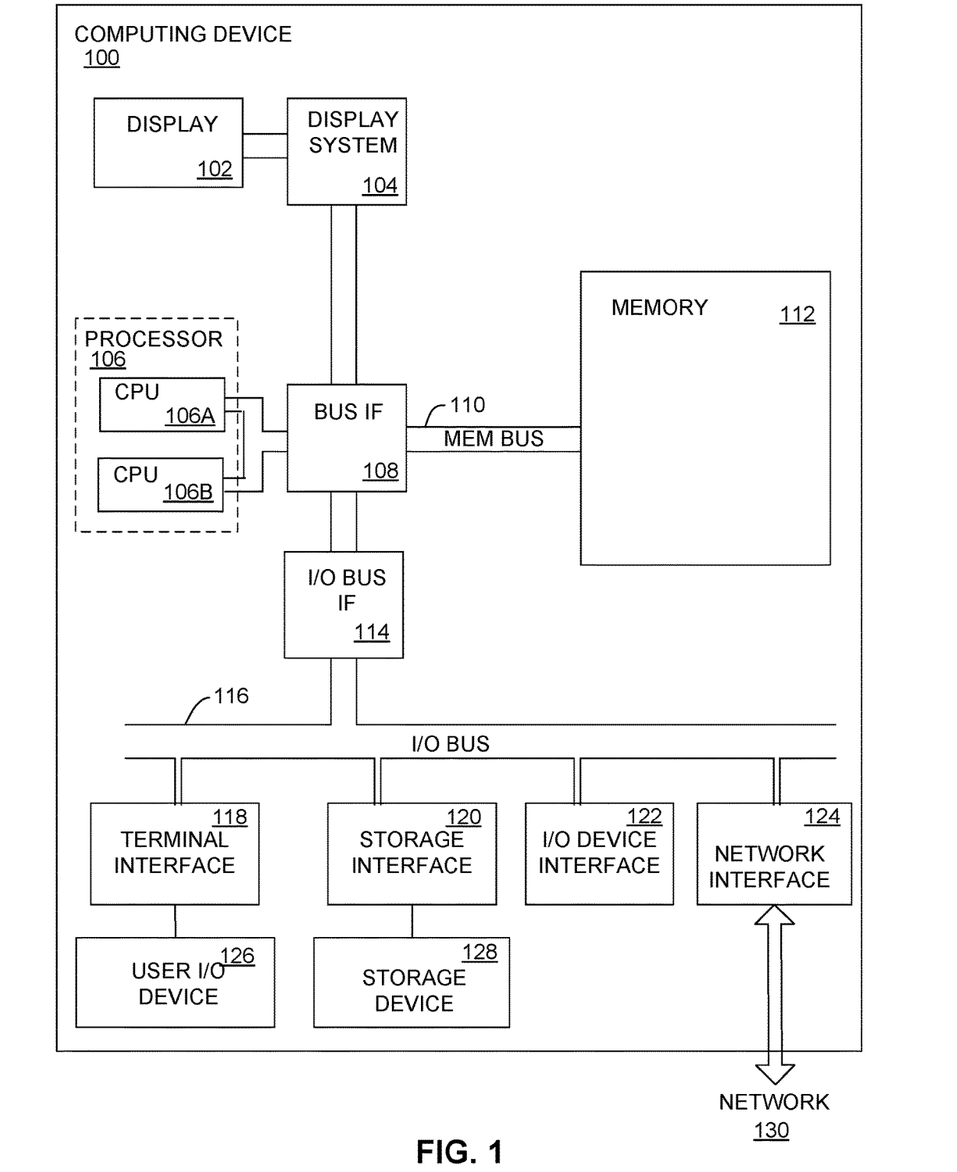
FIG. 1 is a block diagram of an example of a computing device, the computing device having a memory, according to various embodiments.

FIG. 1 is a block diagram illustrating an exemplary embodiment of a computing device that includes a memory. The components of the computing device 100 can include one or more processors 106, a memory 112, a terminal interface 118, a storage interface 120, an Input/Output ("I/O") device interface 122, and a network interface 124, all of which are communicatively coupled, directly or indirectly, for inter-component communication via a memory bus 110, an I/O bus 116, bus interface unit ("IF") 108, and an I/O bus interface unit 114.

The computing device 100 may include one or more general-purpose programmable central processing units (CPUs) 106A and 106B, herein generically referred to as the processor 106. In an embodiment, the computing device 100 may contain multiple processors; however, in another embodiment, the computing device 100 may alternatively be a single CPU device. Each processor 106 executes instructions stored in the memory 112.

The computing device 100 may include a bus interface unit 108 to handle communications among the processor 106, the memory 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106. In addition, one or more of the functions provided by the bus interface unit 108 may be on board an integrated circuit that also includes the processor 106.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of the memory 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory 112, the bus interface 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the I/O bus 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

In an embodiment, the memory 112 may include a random-access semiconductor memory, storage device, or storage medium (either volatile or non-volatile) for storing or encoding data and programs. In another embodiment, the memory 112 represents the entire virtual memory of the computing device 100, and may also include the virtual memory of other computer systems coupled to the computing device 100 or connected via a network 130. The memory 112 may be a single monolithic entity, but in other embodiments the memory 112 may include a hierarchy of caches and other memory devices. For example, memory may exist in multiple levels of caches, and these caches may be further divided by function, so that one cache holds instructions while another holds non-instruction data, which is used by the processor. Memory 112 may be further distributed and associated with different CPUs or sets of CPUs, as is known in any various so-called non-uniform memory access (NUMA) computer architectures.

Figure 2:
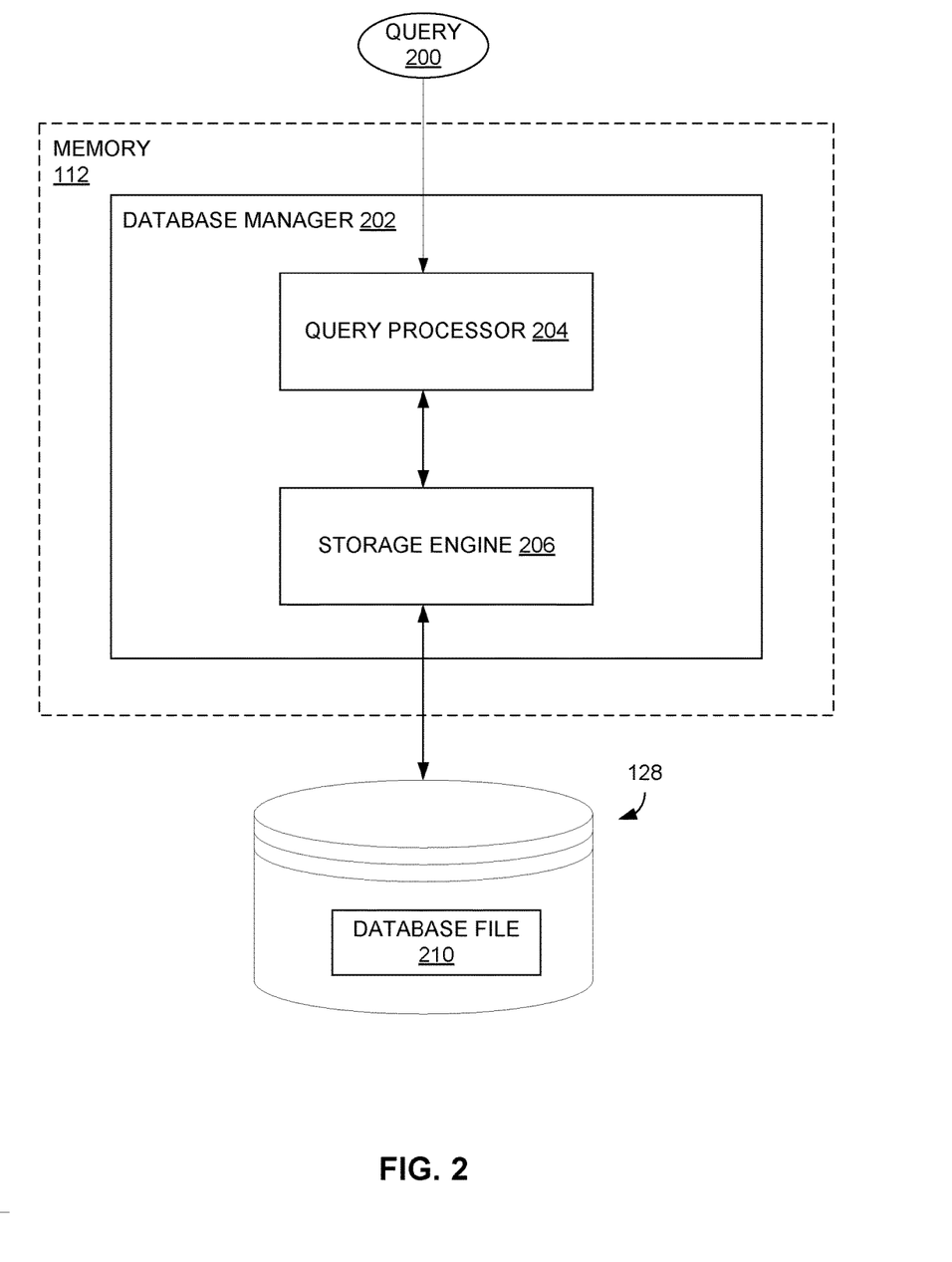
FIG. 2 is a block diagram illustrating an example of an embodiment of components and data that can reside in the memory of FIG. 1, including a storage engine.

The memory 112 may store all or a portion of the components and data shown in FIG. 2. These programs and data structures are illustrated in FIG. 2 as being included within the memory 112 in the computing device 100; however, in other embodiments, some or all of them may be on different computer systems and may be accessed remotely, e.g., via a network 130. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 112, these components and data are not necessarily all completely contained in the same storage device at the same time. Although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 106 or instructions or statements that are interpreted by instructions or statements that execute the processor 106 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different ways, including using various computer applications, routines, components, programs, objects, modules, data structures etc., which may be referred to herein as "software," "computer programs," or simply "programs."

FIG. 2 is a block diagram illustrating an exemplary embodiment of components and data that can reside in the memory of FIG. 1, including a storage engine 206. In an embodiment, the database manager 202 may include a query processor 204 and a storage engine 206. These components and data are operable to perform a single read and delete I/O operation. In an embodiment, a user may utilize a query 200 to request one or more desired database records. The query 200 may be a statement that specifies that the one or more database records shall be read and deleted in a single read and delete I/O operation. In an example, the query 200 may specify that the delete I/O operation is an operation to permanently delete one or more database records from a database file 210 (known as a "hard" delete). The database file 210 may be within a storage device 128, which is hereinafter referred to as a database 128. In another example, the query 200 may specify that the delete I/O operation may not be permanent (known as a "soft" delete). In yet another embodiment, the query 200 may specify that the one or more database records need to be rolled back (placed back) into the database file 210 after the soft deleting has occurred.

The query 200 may be written in any suitable query language that corresponds to the desired database type. For example, the query 200 may be written in structured query language (SQL) for relational databases, data manipulation language (DML) for inserting, updating, or deleting database records in relational databases, multidimensional expression (MDX) for multidimensional or online analytical procession (OLAP) databases, or any other language.

In an embodiment, the database manager 202 may initiate the process of selecting the one or more database records that are being requested from the query 200 by utilizing the query processor 204. The query processor 204 may generate several plans to access database records and execute the most efficient plan. Alternatively, the query processor 204 may generate an efficient plan, which is not necessarily the most efficient. The query processor 204 may include such components as a compiler, a parser engine, an optimizer engine, and an execution engine. A compiler may receive the query 200 and convert the query 200 into machine-readable object code in one read and delete instruction, as opposed to compiling the read and delete I/O operations into two or more instructions.

The parser engine may receive the compiled query 200 and check that the query 200 is correctly specified, resolve names and references, and convert the query 200 into a format utilized by the optimizer engine. The parser engine may convert the query 200 into a data structure, which gives a structural representation of the query 200. For example, the data structure may be an abstract syntax tree, parse tree, or other data structure. In various embodiments, the parser engine may make a plurality of checks, including a syntax check, a check determining whether the query 200 is meaningful, and a shared pool check.

In an embodiment, the optimizer engine receives the parsed read and delete query 200 and combines the query 200 into a single I/O operation. The optimizer engine may also determine an efficient or most efficient query execution plan of selecting the one or more database records based on which database record(s) are requested in the query 200. This may occur by determining the cost of each query execution plan through an estimator. In an embodiment, an estimator may estimate the cost of each query execution plan by measuring the units of work or resources used. For example, the estimator may use disk I/O, central processing unit (CPU) usage, and memory usage to calculate units of work. The cost of a query execution plan may accordingly represent a number of work units that are expected to be absorbed when the query 200 is executed and the results produced. In an embodiment of the present disclosure, the total cost of a query execution plan may be reduced because the plan utilizes a single disk I/O operation to perform a read and delete, as opposed to two or more I/O operations. In an embodiment, the execution engine receives an efficient or most efficient query execution plan according to the optimizer engine, and executes the query against a database 128. The execution engine may also order tables in any particular join order according to any join method, which is chosen by the optimizer engine. For example, the execution engine may run a nested loop, sort merge, or hash method as its chosen join method.

In an embodiment, the storage engine 206 may use the chosen query execution plan from the query processor 204 to select one or more database records from a database file 210. In some embodiments, the storage engine 206 may be a part of the execution engine of the query processor 204. The storage engine 206 provides interface between low level data stored in a database file 210 and higher level applications. The storage engine 206 may interface with the database file 210 by translating various query statements into low-level file system commands. For example, the storage engine 206 may be responsible for reading the one or more database records from a database file, wherein the one or more database records are copied from the database file 210 and stored to a memory 112. The storage engine 206 may also be responsible for deleting the one or more database records from the database file 210. The storage engine 206 is described in more detail in the discussion of FIG. 3 below.

Figure 3:
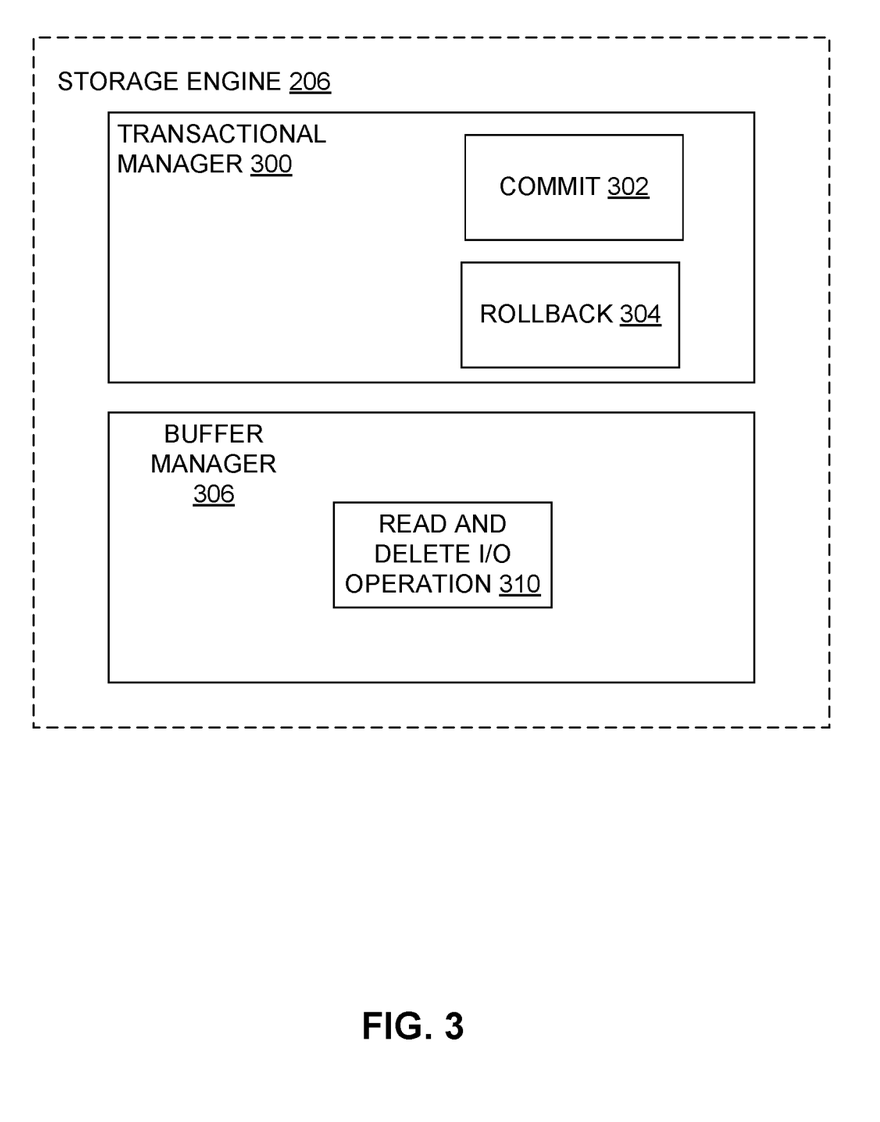
FIG. 3 is a block diagram illustrating an example of different components and operations that can reside in the storage engine 206 of FIG. 2.

FIG. 3 is a block diagram illustrating an example of different components and operations that can reside in the storage engine 206 of FIG. 2. In an embodiment, the storage engine 206 may include a transaction manager 300 and a buffer manager 306. The transaction manager 300 may also include the operations of commitment 302 and rollback 304. A transaction is one or more I/O operations that make up a unit of work performed against a database 128. In an embodiment, the transaction manager 300 may manage different I/O operations as a single transaction cycle. For example, a query 200 may include the I/O operations of reading one or more database records, and updating the values stored in the database file 210. The read and update I/O operations may occur in one transaction.

When the transaction manager 300 utilizes the commit 302 operation, the transaction manager 300 commits to execute the requested I/O operations. Although one transaction may be performed for multiple I/O operation requests, the transaction manager 300 may have to commit 302 for every successful I/O operation. This may equate to network round trips between a database manager 202 and the database file 210 after every I/O operation. For example, if a user desired to read and delete a database record as a single transaction, the transaction manager 300 may still have to commit 302 to a read I/O operation and commit 302 to a delete I/O operation. This may result in expensive transactions because multiple commits 302 are being performed. Each time a transaction manager 300 commits 302 to a particular I/O operation, the transactional manager 300 may have to interact with a database file 210 within the database 128, which may be mechanically slow because of the time needed to move read and write heads, hard drive spin rates, and other limiting factors. In an embodiment, the single read and delete I/O operation may only require a single commit 302, because it is a single I/O operation, which means that such transaction may be less expensive than other transactions. In an embodiment, the commit 302 may be an auto commit or a manual commit.

The rollback 304 operation indicates to the transaction manager 300 that a transaction has failed to complete due to some error and that the transaction needs to be rolled back 304 (be undone). In embodiments of the present disclosure, the transaction manager 300 may utilize the rollback 304 operation by reversing a setting of a delete flag that has been utilized to lock one or more database records from being queried (i.e. soft delete). The reversing may occur by sending the one or more database records from the memory 112 back into a database file 210. For example, the memory 112 may be a commit log, and after the deleting of one or more database records occurs through a soft delete, the one or database records may be written to a commit log. The commit log may be a journal, a journal receiver, or any other commit log. In an embodiment, the transactional manager 300 may perform the rollback 304 operation by reading the one or more database records from the commit log and inserting them back into a database file 210.

The rollback 304 operation may be useful in connection with a single read and delete I/O operation. For example, if a user decided to purchase an online ticket for an event where seating is involved, he or she may select an available seating option, but not yet pay for the ticket. At this point, a transaction manager 300 may place a seal or lock (seat is temporarily reserved) on the particular database record that corresponds to an open seat to prevent another person from purchasing the same ticket. However, if the user followed through and actually purchased the ticket for the seating, the database manager 202 may have to perform a discrete update I/O operation to indicate that the seating is no longer available, which may add an additional commit 302 that is costly as mentioned. In an embodiment of the present disclosure, if there is a single read and delete I/O operation, there would be no need to perform a discrete update I/O operation on the database record because the database record would be deleted from the database file. This means that the work performed by a database manager 202 may be less costly and more efficient. In an embodiment of the present disclosure, if the user decided not to purchase the ticket after selecting the available seating option, the corresponding database record would simply be rolled back to the database file 210 based on the query 200 that specified the rollback 304 operation.

The buffer manager 306 may be responsible for interfacing (e.g., reading, writing, deleting database records) with the database file 210. Further, the buffer manager 306 may store one or more database records that correspond with the query 200 into the memory 112. In order for the buffer manager 306 to perform any I/O operation, the buffer manager 306 may first select one or more database records that are requested based on a query statement.

In various embodiments, the buffer manager 306 may select the one or more database records from different database file 210 types using different selection techniques. For example, the one or more database records may be selected from a database table data structure, and may have a relative record number ("RRN"). The RRN may indicate the database record's logical position in the database file table. For example, relative record numbers of the first, third, and fifth database records in a table may be 1, 3, and 5 respectively. In another embodiment, the data structure may be a simple file such as a binary large object (BLOB), or a character large object (CLOB). Alternatively, the data structure may be arrays with fixed-length entries, or a linked list. In an embodiment, the buffer manager 306 may utilize indexes to access and select the corresponding one or more database records, which groups ranges of database records together thereby making it easier for database record access. For example, the buffer manager 306 may find a database record by utilizing a hash-based index, or a tree-based index such as a B+ tree. Indexes may also be clustered, non-clustered, primary, secondary, dense, sparse or configured in any other manner. In an alternative embodiment, the buffer manager 306 may utilize a full-table scan, wherein the buffer manager 306 scans database records one at a time until a desired one or more database records are selected.

Regarding the read and delete I/O operation 310, the buffer manager 306 may read the one or more database records from a database file 210. As part of the read, the one or more database records may be copied from the database file 210 and stored to a memory 112. The buffer manager 306 may also delete the one or more database records from the database file at substantially the same time as the reading the one or more database records through a single read and delete I/O operation. The time it takes to delete one or more database records after the reading depends on various factors such as how many records are selected, processor 106 type, type of system, or type of memory 112. For example, a query 200 may specify that a read and delete will occur in a single I/O operation such that a buffer manager 306 may delete the one or more database records 0.4 seconds after reading the one or more database records. In another example, a buffer manager 306 may delete the one or more database records 1 second after the reading the one or more database records. In yet another example, the buffer manager 306 may delete the one or more database records 3 seconds after the reading the one or more database records.

The buffer manager 306 may select and read the database record from the database file 210 in various manners. For example, the buffer manager 306 may directly interface with the database file 210 through a block device, such as a raw access storage device, wherein the database manager bypasses the operating system's caches and buffers and accesses the database record (also known as a disk block or physical record) in a database file 210. Alternatively, the buffer manager 306 may select and read the database record through a component of an operating system, called a disk manager, wherein the disk manager receives the low-level file system commands from the buffer manager 306 and manages disk space for storage in the database 210 by performing the actual read and delete I/O operations.

In an embodiment, the buffer manager 306 may read the one or more database records by copying the one or more database records from a first database file to a second database file, and perform the delete by deleting the one or more database records from the first database file. For example, when a user employs a copy file operation (CPYF), the user may desire to copy data from a first file, place data in a second file, and erase the data from the first file. A CPYF command copies all or part of a database or external device file to another database or external device file. A buffer manager 306 may often copy data from the "from" file to the "to" file such that two copies of the data are stored on a system until a user deletes data from the "from" file. Embodiments of the present disclosure may allow a user to utilize the CPYF operation without having to manually delete the one or more database records from the "from" file. Rather, the buffer manager 306 may delete one or more database records from the "from" file at substantially the same time as the one or more database records from the "from" database file are copied to the "to" database file. This may increase database management performance and may reduce the amount of actual data stored on the system, as one or more database records from the "from" database file would automatically be deleted after the read and delete I/O operation.

In an embodiment, the deleting occurs when a buffer manager 306 sets a delete flag at a first time to lock the one or more database records from being queried, and later deletes (but not from the memory 112) the one or more database records from the database file 210 at a second time. This may also be known as a "soft" delete. In various embodiments, the setting of the delete flag at a first time may be 0.4 seconds, 1 second, or 3 seconds after the reading of the one or more database records. In other embodiments, the setting of the flag at a first time may occur at a predetermined time after the one or more database records have been read. For example, the database manager 202 may employ an internal timing engine to determine before any user has made a query 200 request, that the setting of the delete flag will occur 0.4 seconds, 1 second, 2 seconds or any other time that occurs at substantially the same time as the reading of one or more database records. The setting of the delete flag may also occur at the same time as the reading of the one or more database records.

In other embodiments, the second time may refer to 2 seconds, 5 hours, 24 hours, or any time after a buffer manager 306 has set the delete flag. Accordingly, the database manager 202 may set the delete flag at substantially the same time as the reading the one or more database records and actually delete the one or more database records at various subsequent times. For the second time, the buffer manager 306 may perform maintenance on the delete flag by having a disk manager actually delete the one or more database records from a database file 210. Alternatively, the buffer manager 306 may perform maintenance by interacting with the delete flag and directly communicate with the database file 210, through a raw device, to delete the one or more database records from the database file 210.

In an embodiment where the deleting occurs by setting the delete flag, and the one or more database records are locked from being queried, a transaction manager 300 may perform a rollback 304 operation to bring the one or more database records from the memory 112 back to the database file 210, as discussed above. In the rollback 304 operation, the setting of the delete flag is reversed such that the one or more database records are not deleted.

In yet another embodiment, the deleting occurs by permanently deleting the one or more database records from the database file 210 and the memory 112. This may occur when the buffer manager 306 sets a delete flag at a first time to lock the one or more database records from being queried, and later permanently deletes the one or more database records from the database file 210 and the memory 112 at a second time. This may also be known as a "hard" delete. In an embodiment, the permanent deleting may occur by removing (i.e., zeroing out) the one or more database records from the database file 210. For example, a requested one or more database records may contain a plurality of zero and one values in a particular configuration. The permanent deleting may occur when a buffer manager 306 overwrites all of the one or more database record values with all zero values. The permanent deleting may be utilized when a user runs a "reorganize physical file member" (RGZPFM) command. In this embodiment, the RGZPFM command removes (compresses) deleted records from one member of a database file 210 in a database 128, and it optionally reorganizes that member. In various embodiments, the second time may be 0.4 seconds, 5 minutes, 24 hours, or any other amount of time that follows the first time. In various embodiments, the first time may be 0.4, 1 second, 3 seconds, or any time that occurs at substantially the same time as the reading.

In an embodiment, after the buffer manager 306 has read the one or more database records, the database manager 202 may optionally send the one or more database records from the memory to a display screen memory. The one or more database records may then be shown on a display screen and after a user reads or interacts with the one or more database records on the display screen, a subsequent user may not be able to read or interact with the one or more database records on the display screen. For example, a user may query 200 a database record, quickly read or print the database record, and then depart. If a delete flag is set at substantially the same time after the buffer manager 306 reads the one or more database records, and another user tried to quickly query 200 the same database record after the original query 200, the database record could not be queried or viewed again on a display screen, as the delete flag has caused the database record to become locked or inactive for additional queries. This may be useful, for example, to a user who wishes to maintain the integrity of sensitive information by making it impossible for others to view the one or more database records once they have been displayed at a first time.

Figure 4:
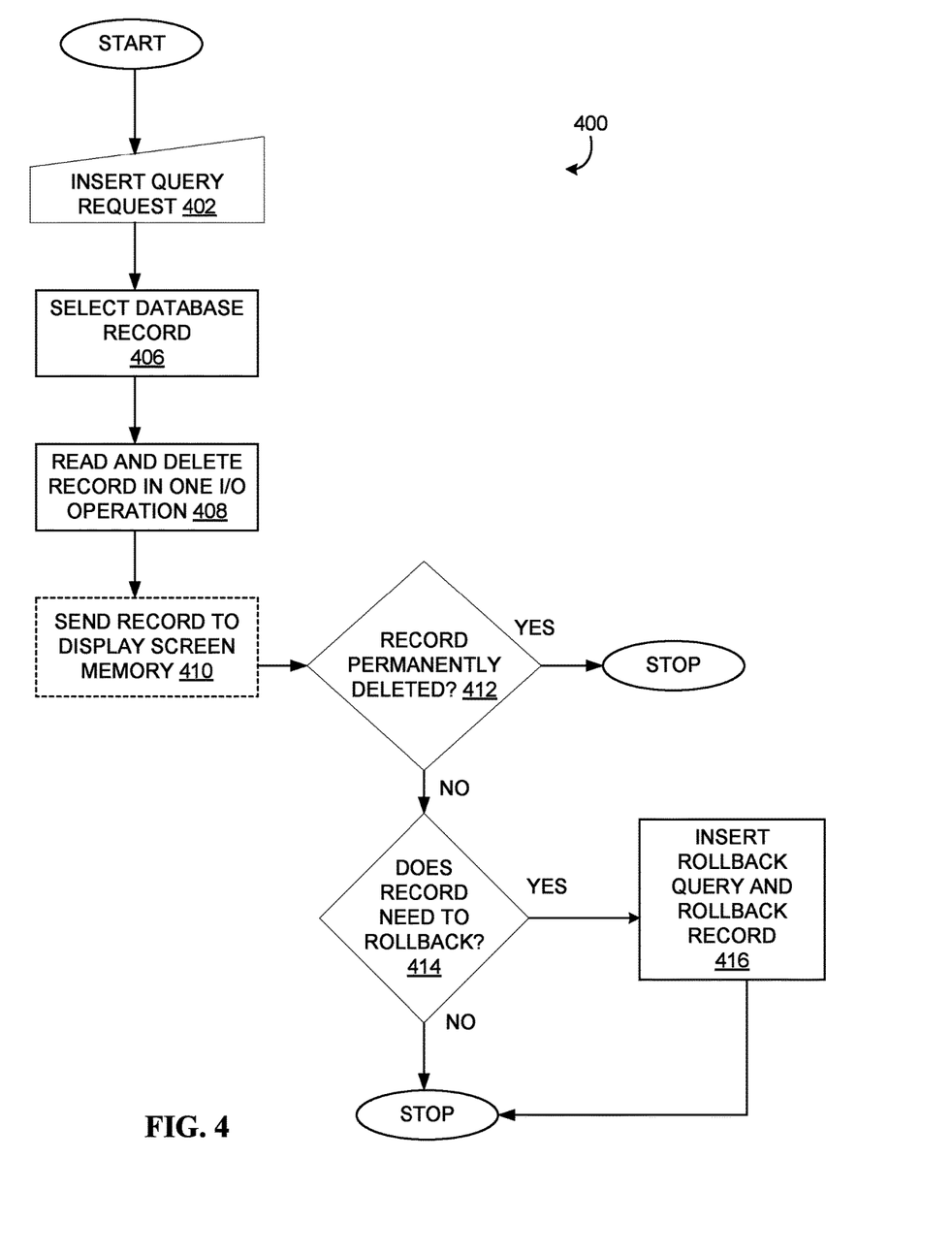
FIG. 4 is a flow diagram of a process for performing a single read and delete I/O operation.

FIG. 4 is a flow diagram of a process for performing a single read and delete I/O operation. Embodiments of the present disclosure are in no way limited to the configuration or order as shown in FIG. 4, as one or more operations may occur simultaneously, in different orders, or within different components of the database manager 202. In an embodiment, the process 400 may start when a user performs operation 402 to insert a query request. A user need not be a person, but operation 402 may result from a computing device that communicates with another computing device, or any other process or mechanism that may insert a query request. In an embodiment, the query request is a query statement that specifies that one or more database records will be read and deleted at substantially the same time through a single I/O operation. In one example, the query request specifies that one or more database records are deleted by setting a delete flag at a first time, wherein the one or more database records are locked from being queried and later deleted from the database file 210 (but not a memory 112) at a second time. In another example, the query request specifies that the one or more database records are permanently deleted.

A query processor 204 may be responsible for initiating operation 406 to select one or more database records that are requested based on the query request. A compiler may be utilized to convert the single read and delete I/O query request into few object code instructions, as opposed to converting multiple I/O query requests into multiple instructions. For example, the single read and delete I/O operation query request may be compiled in one instruction, as opposed to two or more instructions. The database manager 202 may then utilize the query processor 204 to determine which query execution plan will be the least costly. In an example, because the cost of a query execution plan may be increased by having to perform multiple I/O operations, the single read and delete I/O operation may be less costly than other query execution plans. As a part of operation 406, the transaction manager 300 may perform a single commit 302 operation for the single read and delete I/O operation, as opposed to performing two or more commit 302 operations, which may lead to less costly commit 302 cycles for the database manager 202. In an embodiment, after the query processor 204 and transaction manager 300 interact with the one or more database records in preparation for selection or execution, a buffer manager 306 may then select the one or more database records.

In operation 408, the buffer manager 306 reads the one or more database records from a database file 210 such that one or more database records may be copied from the database file 210 and stored to a memory 112. The buffer manager 306 may also delete the one or more database records from the database file 210 at substantially the same time as the reading the one or more database records such that the reading and the deleting occur through a single read and delete I/O operation.

In operation 410, the database manager 202 may then optionally send the one or more database records from the memory 112 to a display screen memory. The one or more database records may then be displayed on a screen. Accordingly, after a user reads or interacts with the one or more database records on the screen, a subsequent user may not be able to read or interact with the one or more database records on the display screen.

In operation 412, if the deleting in operation 408 occurs by permanently deleting the one or more database records from the database file 210 and memory 112 (i.e., hard delete), then the process 400 may end at operation 412 because the one or more database records will have become permanently deleted. Alternatively, if the deleting in operation 408 occurs by setting a delete flag at a first time, and the one or more database records are locked from being queried and later deleted from the database file at a second time, but not deleted from the memory 112 (i.e., soft delete), then the database manager 202 may still be able to interact with the one or more database records. For example, if the one or more database records were not permanently deleted in operation 408, the one or more database records may be stored in the memory 112. If the one or more database records need to be sent back from the memory 112 to a database file 210 as part of the operation 414, then a query request may be made to specify that a rollback of the one or more database records needs to occur as part of operation 416. Subsequently, a transaction manager 300 may perform the rollback 304 operation to return the one or more database records from the memory 112 to the database file 210.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for database management, comprising:
   selecting one or more database records that are requested based on a query statement;
   reading the one or more database records from a first database file, wherein the one or more database records are copied from the first database file and stored to a memory, the memory being a volatile memory; and
   deleting the one or more database records from the first database file at substantially the same time as the reading the one or more database records, wherein the reading and the deleting occur through a single read and delete input/output (I/O) operation, the single read and delete I/O operation requiring a single commit operation, the single read and delete I/O operation reducing an amount of movement of a read/write head of the disk storage device;
   wherein the deleting of the one or more database records includes:
      indicating, before any request, when a delete flag will be set for the any request, and
      permanently deleting the one or more database records from the first database file and the memory by overwriting the one or more database records from the memory and the first database file.

2. The method of claim 1, wherein the deleting the one or more database records includes indicating, at a first time and before the selecting, when a delete flag will be set for any request, setting the delete flag at a second time to lock the one or more database records from being queried, and later deleting, at a third time, the one or more database records from the first database file, the third time being subsequent to the second time, the second time being subsequent to the first time, but not deleting from the memory.

3. The method of claim 1, wherein the deleting occurs by permanently deleting the one or more database records from the first database file and the memory by setting a delete flag at a first time to lock the one or more database records from being queried, and later overwriting the one or more database records from the first database file and the memory at a second time, the second time being subsequent to the first time.

4. The method of claim 1, wherein the deleting includes setting a delete flag to lock the one or more database records from being queried, further comprising rolling back the one or more database records from the memory into the first database file after the setting of the delete flag to reverse the setting of the delete flag, wherein the one or more database records are not deleted.

5. The method of claim 1, further comprising sending, in response to a user request to view the one or more database records and subsequent to the reading the one or more database records, the one or more database records from the memory to a display screen memory, wherein the one or more database records are shown on a display screen, wherein after the user views the one or more database records on the display screen, a subsequent user cannot view the one or more database records on the display screen based on the deleting the one or more database records from the first database file at substantially the same time as the reading the one or more database records, wherein the deleting includes setting a delete flag, the delete flag causing the one or more database records to become unavailable for additional queries.

6. The method of claim 1, wherein the reading occurs in response to a copy file operation (CPYF) user request, wherein the CPYF includes copying the one or more database records from the first database file to a second database file, the first database file being an external device from file, the second database file being an external device to file, and the deleting is deleting the one or more database records from the first database file.

7. A system for database management, the system comprising:
A computing device having a processor and a memory;
wherein the memory stores a query processor and a storage engine, wherein the query processor and the storage engine, when executed by the processor, are operable to:
select one or more database records that are requested based on a query statement;
read the one or more database records from a first database file, wherein the one or more database records are copied from the first database file and stored to a memory; and
delete the one or more database records from the first database file at substantially the same time as the reading the one or more database records, wherein the reading and the deleting occur through a single read and delete input/output (I/O) operation, the single read and delete I/O operation is compiled as a single instruction;
wherein the deleting the one or more database records includes:
indicating, at a first time and before the selecting, when a delete flag will be set for any request,
setting the delete flag at a second time to lock the one or more database records from being queried, and
permanently deleting the one or more database records from the first database file and the memory by overwriting the one or more database records from the first database file and the memory at a third time, the third time being subsequent to the second time, the second time being subsequent to the first time.

8. The system of claim 7, wherein the setting of the delete flag at the first time occurs at a predetermined time after the reading the one or more database records, the predetermined time being set by an internal timing engine before a user issues the query statement, the time being set specifies that the setting of the delete flag will occur at a particular quantity of time after the reading of the one or more database records.

9. The system of claim 8, wherein the deleting includes setting the delete flag to lock the one or more database records from being queried, further comprising rolling back the one or more database records from the memory into the first database file after the setting of the delete flag to reverse the setting of the delete flag, wherein the one or more database records are not deleted.

10. The system of claim 7, further comprising sending, in response to a user request to view the one or more database records and subsequent to the reading the one or more database records, the one or more database records from the memory to a display screen memory, wherein the one or more database records are shown on a display screen, wherein after the user views the one or more database records on the display screen, a subsequent user cannot view with the one or more database records on the display screen based on the deleting the one or more database records from the first database file at substantially the same time as the reading the one or more database records, wherein the deleting includes setting a delete flag, the delete flag causing the one or more database records to become unavailable for additional queries.

11. The system of claim 7, wherein the reading occurs in response to a copy file operation (CPYF) user request, wherein the CPYF includes copying the one or more database records from the first database file to a second database file, the first database file being an external device from file, the second database file being an external device to file, and the deleting is deleting the one or more database records from the first database file.

12. A computer program product comprising a computer readable storage medium having program code embodied therewith, the program code comprising computer readable program code configured for:
selecting one or more database records that are requested based on a query statement;
reading the one or more database records from a first database file, wherein the one or more database records are copied from the first database file and stored to a memory; and
deleting the one or more database records from the first database file at substantially the same time as the reading the one or more database records, wherein the reading and the deleting occur through a single read and delete input/output (I/O) operation, the single read and delete I/O operation reducing an amount of movement of a read/write head of a disk storage device;
wherein the deleting includes deleting the one or more database records from the first database file by setting a delete flag at a first time and later overwriting the one or more database records from the database file, and
sending, in response to a user request to view the one or more database records and subsequent to the reading the one or more database records, the one or more database records from the memory to a display screen memory, wherein the one or more database records are shown on a display screen, and wherein after a particular quantity of time after the showing the deleting occurs such that a subsequent user cannot view the one or more database records on the display screen.

13. The computer program product of claim 12, wherein the deleting the one or more database records occurs by setting a delete flag at a first time to lock the one or more database records from being queried, and later deleting the one or more database records from the first database file at a second time, the second time being subsequent to the first time, but not deleting from the memory, wherein the setting of the delete flag at a first time occurs at a predetermined time after the reading the one or more database records, the predetermined time being specified in the query statement indicating that the deleting will occur at a particular quantity of time after the reading.

14. The computer program product of claim 12, wherein the deleting occurs by permanently deleting the one or more database records from the first database file and the memory by setting a delete flag at a first time to lock the one or more database records from being queried, and later permanently deleting the one or more database records from the first database file and the memory at a second time, the second time being subsequent to the first time, the permanently deleting being a hard delete in response to a reorganize physical file member (RGZPFM) command.

15. The computer program product of claim 12, wherein the deleting occurs by setting a delete flag to lock the one or more database records from being queried, further comprising rolling back the one or more database records from the memory into the first database file after the setting of the delete flag to reverse the setting of the delete flag, wherein the one or more database records are not deleted.

16. The computer program product of claim 12, further comprising sending, in response to a user request to view the one or more database records, the one or more database records from the memory to a display screen memory, wherein the one or more database records are shown on a display screen, wherein after a user reads the one or more database records on the display screen, and without the user making another request, a subsequent user cannot read or interact with the one or more database records on the display screen in response to the deleting of the one or more database records.

17. The computer program product of claim 12, wherein the reading is copying the one or more database records from the first database file to a second database file, and the deleting is deleting the one or more database records from the first database file.

\* \* \* \* \*